United States Patent
Wei et al.

(10) Patent No.: US 11,800,468 B2
(45) Date of Patent: *Oct. 24, 2023

(54) SYNCHRONIZATION SIGNALS IN 5G

(71) Applicant: FUJITSU LIMITED, Kawasaki (JP)

(72) Inventors: Xusheng Wei, Staines (GB); Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,150

(22) Filed: Sep. 16, 2022

(65) Prior Publication Data
US 2023/0007605 A1 Jan. 5, 2023

Related U.S. Application Data

(63) Continuation of application No. 16/660,329, filed on Oct. 22, 2019, now Pat. No. 11,477,742, which is a
(Continued)

(30) Foreign Application Priority Data

May 2, 2017 (EP) .................. 17169137

(51) Int. Cl.
*H04W 56/00* (2009.01)
*H04J 11/00* (2006.01)
(Continued)

(52) U.S. Cl.
CPC ....... *H04W 56/001* (2013.01); *H04J 11/0069* (2013.01); *H04L 5/0007* (2013.01); *H04W 72/30* (2023.01)

(58) Field of Classification Search
CPC . H04W 56/001; H04W 72/30; H04J 11/0069; H04L 5/0007
See application file for complete search history.

(56) References Cited

U.S. PATENT DOCUMENTS 8,948,096 B2 * 2/2015 Tanaka .................. H04W 48/12
370/329
2002/0021718 A1 * 2/2002 Kerhuel .............. H04B 7/2681
370/510
(Continued)

FOREIGN PATENT DOCUMENTS

| WO | 2010/016221 A1 | 2/2010 |
| WO | 2015/080649 A1 | 6/2015 |
| WO | 2018/087513 A1 | 5/2018 |

OTHER PUBLICATIONS

NTT DOCOMO, "New SID Proposal: Study on New Radio Access Technology," 3GPP TSG RAN Meeting #71, Agenda Item: 9.1, RP-160671, Mar. 7-10, 2016, Göteborg, Sweden.
(Continued)

*Primary Examiner* — Jenee Holland
(74) *Attorney, Agent, or Firm* — Myers Wolin, LLC

(57) ABSTRACT

A cell search and synchronization method in a wireless communication system providing at least one cell having a frequency span in the frequency domain, the method includes: defining, for a said cell, a plurality of resources within the frequency span and within a defined time frame for transmitting a synchronization signal wherein a resource is characterised by a location in the frequency domain and a location in the time domain; and transmitting the synchronization signal in more than one of the plurality of resources.

11 Claims, 6 Drawing Sheets

Related U.S. Application Data continuation of application No. PCT/EP2018/057079, filed on Mar. 20, 2018.

(51) Int. Cl.
*H04L 5/00* (2006.01)
*H04W 72/30* (2023.01)

(56) References Cited

U.S. PATENT DOCUMENTS

| | | | |
|---|---|---|---|
| 2005/0008040 A1* | 1/2005 | Becker | H04B 1/70754 370/503 |
| 2007/0098053 A1 | 5/2007 | Rinne et al. | |
| 2007/0121484 A1 | 5/2007 | Kim et al. | |
| 2008/0273522 A1 | 11/2008 | Luo et al. | |
| 2009/0219883 A1* | 9/2009 | Cho | H04L 5/0048 370/330 |
| 2009/0220014 A1 | 9/2009 | Higuchi et al. | |
| 2012/0184312 A1 | 7/2012 | Yamamoto et al. | |
| 2014/0198772 A1 | 7/2014 | Baldemair et al. | |
| 2014/0286286 A1* | 9/2014 | Yamazaki | H04L 27/2655 370/329 |
| 2015/0208372 A1* | 7/2015 | You | H04J 11/0069 370/350 |
| 2015/0296467 A1 | 10/2015 | Kim et al. | |
| 2016/0037549 A1* | 2/2016 | Seo | H04W 76/14 370/329 |
| 2016/0044710 A1* | 2/2016 | Lee | H04W 52/383 370/312 |
| 2016/0128022 A1 | 5/2016 | Park et al. | |
| 2016/0234761 A1* | 8/2016 | Chong | H04L 27/0014 |
| 2016/0308637 A1* | 10/2016 | Frenne | H04L 5/0048 |
| 2016/0374035 A1* | 12/2016 | Wang | H04J 11/0069 |
| 2017/0034798 A1 | 2/2017 | Lin et al. | |
| 2017/0048810 A1* | 2/2017 | Sahlin | H04L 27/26 |
| 2017/0078998 A1* | 3/2017 | Li | H04W 56/00 |

OTHER PUBLICATIONS

The extended European search report including the European search report, the partial European search report/declaration of no search, and the European search opinion issued for corresponding European Patent Application No. 17169137.1 dated Nov. 13, 2017.

Notification of Transmittal of the International Search Report and the Written Opinion of the International Searching Authority, or the Declaration issued for corresponding International Patent Application No. PCT/EP2018/057079, dated Jun. 5, 2018.

Notice of Reasons for Refusal issued by the Japan Patent Office for corresponding Japanese Patent Application No. 2019-557398, dated Dec. 1, 2020, with a full English machine translation.

NTT DOCOMO, Inc., "Consideration on wider BW operation for NR", Agenda Item: 7.1.4, 3GPP TSG-RAN WG1 Meeting #87, R1-1612710, Reno, USA, Nov. 14-18, 2016.

Ericsson, "NR synchronization signal bandwidth and multiplexing", Agenda Item: 5.1.1.1.1, 3GPP TSG-RAN WG1 NR adhoc, R1-1700292, Spokane, USA, Jan. 16-20, 2017.

Non-Final Office Action issued by the United States Patent and Trademark Office for corresponding U.S. Appl. No. 16/660,329, dated Jan. 7, 2021.

Final Office Action issued by the United States Patent and Trademark Office for corresponding U.S. Appl. No. 16/660,329, dated May 7, 2021.

Non-Final Office Action issued by the United States Patent and Trademark Office for corresponding U.S. Appl. No. 16/660,329, dated Oct. 27, 2021.

Notice of Allowance issued by the United States Patent and Trademark Office for corresponding U.S. Appl. No. 16/660,329, dated Jun. 15, 2022.

* cited by examiner

SYNCHRONIZATION SIGNALS IN 5G

CROSS REFERENCES TO RELATED APPLICATIONS

This application is a continuation application of U.S. patent application Ser. No. 16/660,329, filed Oct. 22, 2019, now pending, which is a continuation of International Patent Application No. PCT/EP2018/057079, filed Mar. 20, 2018, which claims priority to European Patent Application No. EP17169137.1 filed May 2, 2017, the contents of each are herein wholly incorporated by reference.

FIELD

The present disclosure relates to a wireless communication method in which terminals connect to cells in a wireless network. The present disclosure further relates to a wireless communication system, a terminal, a base station and a computer program for use in said method.

Particularly, but not exclusively, the present disclosure relates to techniques for assisting a terminal in synchronizing with a cell in a "5G" wireless communication system.

BACKGROUND

Wireless communication systems are widely known in which terminals (also called user equipments or UEs, subscriber or mobile stations) communicate with base stations (BSs) within communication range of the terminals.

At a given carrier frequency the different geographical areas served by one or more base stations are generally referred to as cells, and typically many BSs are provided in appropriate geographical locations so as to form a network covering a wide geographical area more or less seamlessly with adjacent and/or overlapping cells. (In this specification, the terms "system" and "network" are used synonymously). Each BS may support one or more cells and in each cell, the BS divides the available bandwidth, i.e. frequency and time resources, into individual resource allocations for the user equipments which it serves. The fundamental divisions of resource allocation are the subcarrier spacing (in the frequency domain) and the symbol duration (in the time domain). Subcarriers and symbols form resource elements (REs) which are grouped into Resource Blocks (RBs). The subcarriers are arranged with respect to the carrier frequency and the symbols are arranged with respect to a frame timing. In this way, a signal transmitted in the cell and scheduled by the BS occupies a specific resource which may be characterised by a location in the frequency domain and a location in the time domain. A terminal may be in range of (i.e. able to detect signals from and/or communicate with) several cells at the same time, but in the simplest case it communicates with one "serving" cell.

In current, "4G" systems, also known as LTE or LTE-A, a terminal has to perform cell search and synchronization in order to connect to a cell. For this purpose, each cell broadcasts synchronization signals referred to as the Primary and Secondary Synchronization Signals (PSS/SSS). These signals, which are transmitted at the carrier frequency, establish a timing reference for the cell, and carry a physical layer cell identity and physical layer cell identity group for identifying the cell. In more detail, PSS is used to achieve subframe, slot and symbol synchronization in the time domain; and to narrow down the possible Physical layer Cell Identity (PCI) of the cell. PCI are organised into 168 groups of 3, and the Primary Synchronization Signal provides a pointer to the position of the PCI within the group but does not identify the group itself. SSS is used to achieve radio frame synchronization (PSS alone is insufficient for this, as PSS is transmitted identically twice in a frame), and identifies the PCI group so the PCI can be deduced when combined with the pointer from the PSS.

In an LTE system, in the frequency domain, transmissions occur within at least one frequency band assigned to the system operator. The range of frequencies used to provide a given cell (referred to below as a "frequency span") are generally a subset of those within the assigned frequency band. In the time domain, transmission is organized in "frames" which are subdivided into "subframes". In one frame structure used in LTE, a 10 ms frame is divided into 10 subframes each of 1 ms duration. In LTE, each of the PSS and SSS is transmitted twice per frame, in other words with a 5 ms periodicity (and consequently, only in some subframes). For example, PSS and SSS are both transmitted on the first and sixth subframe of every frame. LTE employs OFDM (Orthogonal Frequency Division Multiplexing) for the air interface. It is expected that 5G systems will also employ OFDM and variants thereof. The OFDM configuration in terms of particular values for sub-carrier spacing, symbol duration, cyclic prefix, and other parameters for a given frequency band is referred to as a "numerology".

In LTE specifications, a terminal can be considered as either synchronized or unsynchronized with respect to a cell. As noted above, successfully decoding the PSS and SSS allows a terminal to obtain synchronization information, including downlink subframe timing and cell ID for a cell; in other words the terminal becomes "synchronized" with the cell. In the synchronized state, the terminal can decode system information including a Master Information Block (MIB) contained in a Physical Broadcast Channel (PBCH) broadcast by the cell. The terminal can then begin to receive user data (packets) on a downlink from the cell, and/or, typically after some further protocol steps, transmit user data on an uplink using the cell.

A terminal typically needs to measure characteristics of radio communication channels between itself and a given cell in order to provide appropriate feedback to that cell. To facilitate measurements of the channel by terminals, reference signals are transmitted by the cells. The process of a terminal making measurements on reference signals and reporting the measurements to a BS is part of Radio Resource Management, RRM.

Nowadays mobile access to Internet or another mobile point is becoming a crucial necessity for both business and personal life and there are significant challenges to the current wireless systems due to the popularity of new applications such as social networking, cloud based services and big data analysis. With the forthcoming services such as Internet of things and ultra-reliable, mission-critical connections, a next-generation system to succeed LTE/LTE-A and known as "5G" or "NR" (New Radio) will be needed to satisfy all those demanding requirements.

The next generation mobile network, 5G, together with its eco system, is targeted to be rolled out by 2020 in order to overcome the inadequacies of LTE/LTE-A.

Simultaneous requirements to be met comprise greatly increased traffic; many more devices; reduced latency; low-power and low-cost solutions for Machine-to-Machine (M2M) devices; and increased peak and guaranteed data rates. The intention of 5G is to satisfy all requirements of these applications and ideally, 5G could provide at least the following features:

Ultra-reliable connection in addition to higher data rate, higher capacity and higher spectral efficiency Unified user experience together with significant reduction on latency Scalability/adaptability to applications with significant different Quality of Service (QoS) requirements Access all spectrum and bands and support different spectrum sharing schemes From a traffic profiles point of view, it is expected that 5G will support at least three profiles with significant different properties, namely:

Of particular relevance to the present disclosure is the impact of the available frequency spectrum available to the system, which may be a combination of multiple frequency bands. In the longer term, it is expected that much more spectrum will be available to meet traffic demand. To date, spectrum for mobile communication has focused on frequencies below 6 GHz. In the time frame of 2020 to 2030, more spectrum at higher frequencies such as 6 GHz, 10 GHz or even up to 100 GHz will be considered. At the same time wider frequency bands will be available at these extreme higher frequencies. More detailed information is provided in Table 1 (source: Ofcom, "Spectrum above 6 GHz for future mobile communications", February 2015).

TABLE 1

Possible spectrum allocation for 5G and beyond

| Spectrum | Possible allocation |
|---|---|
| 5 GHz | This band is being considered at the ITU World Radio Conference in 2015 (WRC-15)-in total over 300 MHz in new spectrum could be allocated |
| | If agreed at WRC-15, a contiguous band from 5150 to 5925 MHz would be created using a combination of existing and new spectrum |
| | Channel sizes likely based on current Wi-Fi use, in multiples of 20 MHz, and the band may remain as a licence-exempt band in line with current Wi-Fi |
| 15 GHz | Potentially over 500 MHz contiguous spectrum depending on the sub-band used and sharing with existing uses |
| | Very high speeds are achievable-for example, peak speeds of 5 Gbps have been demonstrated already |
| | Channel sizes could be very wide, for example, multiples of 100 MHz |
| 28 GHz | Similar to the 15 GHz band, for example, over contiguous 500 MHz of spectrum depending on the sub-band used and sharing with existing uses |
| | Channel sizes could be very wide, for example, multiples of 100 MHz |
| | Depending on the bandwidth available, the band could accommodate multiple operators with the opportunity for companies other than established mobile operators to offer some 5G services with an assignment of 100 MHz per operator, or more, depending on national availability and sharing with existing services. |
| 60-80 GHz | Potentially up to 5 GHz of contiguous spectrum depending on the selected sub-band (for example, 71-76 MHz and/or 81-86 GHz) |
| | Channel sizes could be very wide, for example, multiples of 100 MHz |
| | Depending on the bandwidth available, the band could accommodate multiple operators with the opportunity for companies other than established mobile operators to offer some 5G services with a 100 MHz assignment per operator, or more, depending on national availability and sharing with existing services. |

(i) high throughput with high mobility traffic;
(ii) low-energy consumption and long lived sensor-based services; and
(iii) extremely low latency and high reliability services.

From the industry point of view, 5G will not only provide traditional voice and data services but also expand and penetrate to other industries such as automotive, agriculture, city management, healthcare, energy, public transportation etc., and all these will lead to a large ecosystem which has never been experienced before.

The technical challenges for designing such a sophisticated and complicated system are tremendous and significant breakthroughs will be required both on the network side and in the radio interface. Regarding the physical layer of the radio interface, new techniques will be introduced in order to support aforementioned 5G requirements. One important objective of studies in 3GPP (see for example the 3GPP discussion document RP-160671, New SID Proposal: Study on New Radio Access Technology, NTT DOCOMO) is to investigate fundamental physical layer designs such as waveform design, basic numerology and frame structure, channel coding scheme(s) and so on for meeting key 5G requirements.

Practical 5G systems will typically employ subranges of the employed bands assigned to different operators, where each subrange is referred to as a system bandwidth or frequency span. Terminals (UEs) for use in the 5G system may be equipped with multiple receiver chains (sets of RF circuitry) to enable them to communicate using more than one frequency span. Each system bandwidth/frequency span is associated with a centre frequency (also referred to as "spectrum location"). For example one operator may be assigned a band with 200 MHz bandwidth from 1.9 GHz to 2.1 GHz, the centre frequency being 2 GHz in which case the "spectrum location" is 2 GHz. On the other hand, if an operator has a band with 200 MHz bandwidth from 5.9 GHz to 6.1 GHz, then the "spectrum location" is 6 GHz. Although in LTE the centre frequency of the system bandwidth/frequency span is typically considered to be the carrier frequency, this is not necessarily the case in 5G systems.

The new system should also be designed to be robust against phase noise, which is larger in higher frequency bands. One solution to this issue is to scale the OFDM configuration including the subcarrier spacing, thus defining a set of numerologies to exploit the various frequency bands optimally. An example of such a set of numerologies is shown in Table 2 below:

TABLE 2

Proposed Numerologies for 5G

| OFDM parameter | Up to 6 GHz | Up to 20 GHz | Up to 40 GHz | Above 40 GHz |
|---|---|---|---|---|
| Subcarrier spacing | 15 kHz | 30 kHz | 60 kHz | $2^L \times 60$ KHz |
| Clock frequency | 61.44 MHz | 122.88 MHz | 245.76 MHz | $2^L \times 245.76$ MHz |
| Samples per OFDM symbol | 4096 | 4096 | 4096 | 4096 |
| OFDM symbol duration | 66.77 µs | 33.33 µs | 16.67 µs | $16.67/2^L$ µs |
| CP samples | 288 | 288 | 288 | 288 |
| CP duration | 4.69 µs | 2.35 µs | 1.17 µs | $1.17/2^L$ µs |

In the final column of Table 2, the column "Up to 6 GHz" corresponds to the existing LTE numerology. In this scheme, each numerology has its particular subcarrier spacing and corresponding OFDM symbol duration. The 15 kHz subcarrier spacing as employed in LTE used as the baseline subcarrier spacing and other possible subcarrier spacings can be obtained as multiples of the 15 kHz value. Incidentally, in the column "Above 40 GHz", L is an integer allowing for the possibility of much wider subcarrier spacings. However, the above is only an example and many variations are possible.

When considering frequency spans and channel sizes in a wireless communication system, the concept of a "channel raster" (also called "carrier raster" or "frequency raster") is important. In general, a "raster" is a step size applied to the possible location of any signal or channel. For systems such as GSM, UMTS and LTE, a channel raster means a set of locations in the frequency domain, typically equally spaced, where the carrier centre frequency can be located. The above mentioned cell search and synchronization procedure involves a terminal receiver scanning a frequency range to detect carrier frequencies at which synchronization signals are transmitted, under the assumption that synchronisation signals are transmitted at the carrier centre frequency. Thus, the distance between two consecutive places in a channel raster can be assumed as a step size when a terminal tries to search for the carrier frequency.

Unlike many previous systems, in 5G, however, it is not necessarily the case that the synchronization signals are located at the centre frequency of the carrier. More generally, the channel raster can be defined as a set of places in the frequency domain and within a frequency span at which a carrier can be found by a terminal, but such a place may or may not be the carrier centre frequency. Furthermore the current understanding of "carrier frequency" may not be directly applicable in 5G/NR, so alternative terminology such as "frequency span" may be preferable.

With the introduction of extremely high frequencies, wider bandwidths and multiple numerologies for 5G usage in future, 5G physical design will be noticeably different compared with LTE design. Consequently there is a need to devise an initial cell search and synchronization procedure suitable for 5G, and to provide suitable mechanisms for the design of synchronization signals and broadcast signals.

SUMMARY

According to a first aspect of the present disclosure, there is provided a cell search and synchronization method in a wireless communication system providing at least one cell having a frequency span in the frequency domain, the method comprising:

defining, for a said cell, a plurality of resources within the frequency span and within a defined time frame for transmitting a synchronization signal wherein a resource is characterised by a location in the frequency domain and a location in the time domain; and transmitting the synchronization signal in more than one of the plurality of resources.

The above "synchronization signal" may be a primary synchronization signal, and/or it may be a secondary synchronization signal. It is expected that both types of synchronization signal will be employed in a 5G wireless communication system. Thus, preferably, the synchronization signal comprises one or more instances of a primary synchronization signal and one or more instances of a secondary synchronization signal used by a terminal in the wireless communication system to synchronize with the cell.

Transmitting the synchronization signal may include determining how many of the plurality of resources to employ for transmitting a primary synchronization signal in the defined time frame, whereby the number of resources, each employed for transmitting one instance of the primary synchronization signal, may vary from one time frame to another time frame.

Preferably, a secondary synchronization signal as already mentioned is transmitted in one or more resources within the frequency span and within the defined time frame, one or more of said secondary synchronization signals being used by the terminal to obtain further information about the cell, the method further comprising defining the possible resources for transmission of a secondary synchronization signal such that there is a predetermined relationship between a resource in which a primary synchronization signal is transmitted and at least one resource in which a secondary synchronization signal is transmitted.

The predetermined relationship just referred to may include a mapping of an integer number M of transmissions of the primary synchronization signal to an integer number N of transmissions of the secondary synchronization signal where M>=1, N>=1 and M>=N or M<=N.

As with the primary synchronization signal, transmitting the secondary synchronization signal may include determining how many of the possible resources to employ for transmitting the secondary synchronization signal in the defined time frame, whereby the number of instances of the secondary synchronization signal may vary from one time frame to another.

The method may further comprise transmitting a broadcast channel at one or more resources within the frequency span, the method further comprising defining possible resources for the broadcast channel within the time frame such that there is a predetermined relationship between a resource in which the secondary synchronization signal is transmitted and at least one resource in which the broadcast channel is transmitted.

Here, the predetermined relationship may involve a mapping between an integer number N of transmissions of the secondary synchronization signals and an integer number P of transmissions of the broadcast channel within the defined time frame, where N>=1, P>=1 and N>=P or N<=P.

Alternatively the method may further comprise transmitting a broadcast channel in one or more resources within the frequency span, the method further comprising defining possible resources for the broadcast channel such that there is a predetermined relationship between a resource in which the primary synchronization signal is transmitted and at least one resource in which the broadcast channel is transmitted. In other words, the predetermined relationship may be between the primary synchronization signal and broadcast channel, rather than between the secondary synchronization signal and the broadcast channel.

In any case, transmitting the broadcast channel may include determining how many of the possible resources for the broadcast channel to employ in the defined time frame, whereby the number of resources used for transmission of the broadcast channel may vary between one time frame and another.

The broadcast channel may be transmitted in a plurality of resources within the frequency span and an identical content may be transmitted in each of the resources.

The transmitting may provide multiple instances of at least one of:
the primary synchronization signal;
the secondary synchronization signal; and
the broadcast channel.

In any method as defined above, where the system has at least one channel raster, the same channel raster may be used to define all of said frequency domain locations within the frequency span.

In any method as defined above, the resources defined for transmitting the synchronization signal are preferably distributed over substantially the whole frequency span used by the cell.

In any method as defined above, the defining step is preferably based on a numerology applicable to the frequency span of the cell.

According to a second aspect of the present disclosure, there is provided a wireless communication system comprising a base station controlling at least one cell, the cell having a frequency span in the frequency domain, the base station arranged to:
define, for the cell, a plurality of resources within the frequency span and within a defined time frame for transmitting a synchronization signal wherein a resource is characterised by a location in the frequency domain and a location in the time domain; and
cause the synchronization signal to be transmitted in more than one of the plurality of resources.

According to a third aspect of the present disclosure, there is provided a base station for use in a wireless communication system, the base station controlling at least one cell having a frequency span in the frequency domain, the base station arranged to:
define, for the cell, a plurality of resources within the frequency span and within a defined time frame for transmitting a synchronization signal wherein a resource is characterised by a location in the frequency domain and a location in the time domain; and
cause the synchronization signal to be transmitted in more than one of the plurality of resources.

According to a fourth aspect of the present disclosure, there is provided a terminal for use in a wireless communication system providing at least one cell having a frequency span in the frequency domain, the terminal arranged to:
determine, for said cell, a plurality of frequency domain locations within the frequency span and within a defined time frame, for possible reception of a synchronization signal; and to
perform a cell search by detecting a synchronization signal transmitted by the cell in one or more resources at one or more of the plurality of determined frequency domain locations within the frequency span.

The above mentioned system, base station and terminal may employ any of the features defined above with respect to methods of the disclosure.

A further aspect provides a computer program including computer-readable instructions which, when executed by a transceiver-equipped computing device, provide the base station or the terminal as defined above. Such instructions may be stored on a computer-readable medium.

As will be apparent from the above, features in embodiments includes the following:
A method which is designed for the cell search and synchronization procedure in a communication system, comprising:
PSS transmission in more than one resource within the operating bandwidth where each possible individual PSS transmission resource position in the frequency domain is indicated by a channel raster
SSS transmission in one or more resources within the operating bandwidth where each possible individual SSS transmission resource position in the frequency domain is indicated by a channel raster
PBCH transmission in one or more resources within the operating bandwidth where each possible individual PBCH transmission resource position in the frequency domain is indicated by a channel raster
wherein
There is a predetermined relationship between the frequency domain location of at least one PSS and at least one SSS
There is a predetermined relationship between the frequency domain location of at least one PSS or SSS and at least one PBCH The above mentioned PSS and/or SSS transmissions in more than one resource may be limited to particular time periods.

Preferable features in embodiments include:
Multiple PBCH contain identical information
The number of PSS transmitted can be changed with time
The number of SSS transmitted can be changed with time
The number of PBCH transmitted can be changed with time
The same channel raster is used for PSS, SSS and PBCH
The operating bandwidth corresponds to the bandwidth used by a cell In general, and unless there is a clear intention to the contrary, features described with respect to one aspect of the disclosure may be applied equally and in any combination to any other aspect, even if such a combination is not explicitly mentioned or described herein.

In this specification, the term "span" is used to denote a range of frequencies employed in a wireless communication system. A distinction can be made between the size or width of a span (which may be defined as the difference between start and end frequencies of the span, such as 100 MHz), and its location within the electromagnetic spectrum (centre frequency such as 2 GHz or 28 GHz). In embodiments, more than one frequency span is available simultaneously, possibly in different parts of the electromagnetic spectrum, and these may be of the same or different widths.

The term "cell" used above is to be interpreted broadly, and may include, for example, parts of a cell, a beam, or the communication range of a transmission point or access point. As mentioned earlier, cells are normally provided by base stations. Each cell is associated with a respective frequency span which is a range of wireless frequencies used by the cell. Base stations may take any form suitable for transmitting and receiving signals from other stations in a 5G system. This includes a so-called "gNB" which may have a controlling or supervisory function over transmission/reception points.

The "terminal" referred to above may take the form of a user equipment (UE), subscriber station (SS), or a mobile station (MS), or any other suitable fixed-position or movable form. For the purpose of visualising the disclosure, it may be convenient to imagine the terminal as a mobile handset (and in many instances at least some of the terminals will comprise mobile handsets), however no limitation whatsoever is to be implied from this.

BRIEF DESCRIPTION OF THE DRAWINGS

Reference is made, by way of example only, to the accompanying drawings in which.

DETAILED DESCRIPTION

Figure 1:
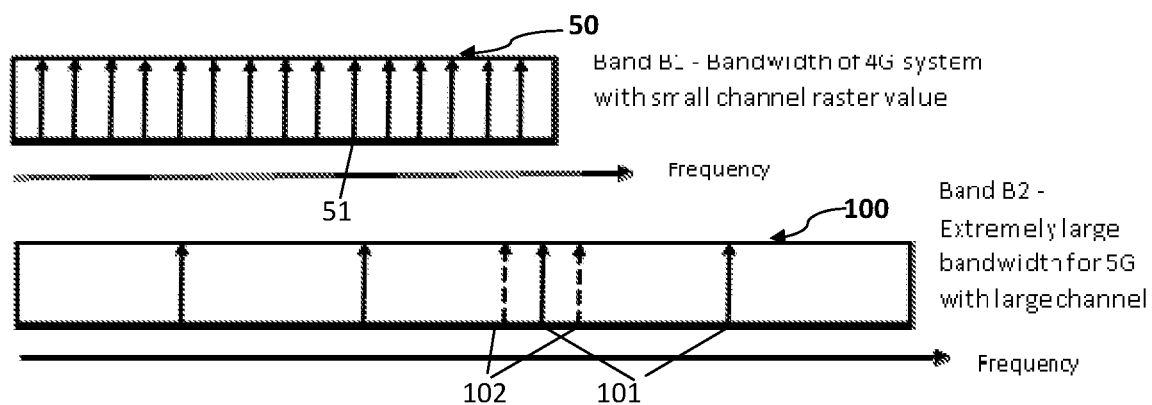
FIG. 1 shows how different raster values can be used for different bandwidths in a wireless communication system.

When a terminal is switched on or completely loses a connection, it will typically try to connect/reconnect to a cell. At this stage that terminal may have very limited information of the possible serving cells and the local communication system(s) and will rely on a cell search/synchronization procedure, a fundamental physical layer procedure, to get the timing/frequency properties and identity information of any potential serving cells. With this information at hand, that terminal can further exploit other important system information and finish its initial access to a serving cell (e.g. by initiating a random access procedure). The following table provides a list of the main factors which should be considered during the design of the cell search/synchronization procedure.

TABLE 3

Parameters impacting the performance of the synchronization procedure

| Parameter | Design considerations | LTE design |
|---|---|---|
| Channel raster | The carrier central frequency must be a multiple of channel raster, a trade-off between fine tuning possibilities (to be able to position a carrier with fine resolution) and implementation limitations in searching for a large number of candidate centre frequencies. | 100 kHz The same value is also used in UMTS |
| Number of synchronization sequences | A larger number of sequences allows more information to be indicated by the choice of sequence (e.g. cell ID) | Two stage synchronization procedure based on PSS and SSS, reducing the total number of different candidate sequences to be processed. The transmitted PSS and SSS sequences together indicate the cell ID |
| Synchronization signal sequence design | Good autocorrelation and cross-correlation properties to allow overlapping sequences to be distinguished Sequence length is a compromise between detection performance, detection complexity and resource usage | PSS signal is constructed based on Zadoff-Chu sequence. SSS signal is based on M sequences. |

TABLE 3-continued

Parameters impacting the performance of the synchronization procedure

| Parameter | Design considerations | LTE design |
|---|---|---|
| Frequency and time domain location of the synchronization signal | This may be a compromise between minimising the number of possible locations to search and controlling the interference between different synchronization signals. The density of synchronization signal transmission in the time domain should be sufficient to allow reasonable cell search within a reasonable amount of time, and to track possible changes in the channel time delay (e.g. due to UE mobility). | Frequency domain location is fixed, PSS and SSS are transmitted in the central 6 resource blocks of a carrier. Transmitted periodically, twice per radio frame (10 ms), the location of PSS and SSS are fixed within each radio frame With fixed locations in the time and frequency domains, sequences from synchronized cells will overlap and distinguishing different sequences relies on the number of different sequences and their correlation properties. |
| Resources occupied by synchronization signals | Longer synchronization sequences are easier to detect and can support a larger number of different sequences, but this would use more time/frequency resource | With fixed locations in the time and frequency domains, sequences from synchronized cells will overlap, but this uses less time/frequency resource. |
| Relationship of synchronization signals to other signals | Once synchronization sequences for a cell are detected by a UE, it needs to be able to identify the location/characteristics of other signals, for example common reference signals and PBCH (broadcast channel carrying basic system information) | When PSS and SSS are received the UE knows cell ID, carrier centre frequency and subframe timing. This information is required for reception of PBCH. |

Those parameters will be jointly considered during the synchronization procedure design for 5G. For example, if we consider a two-step synchronization procedure, then one solution is to broadcast both PSS and SSS, as in the current LTE synchronization procedure. Considering the aforementioned spectrum allocation for 5G and compared with the spectrum usage situation of LTE, the following items should be considered when determine whether to reuse the LTE synchronization procedure or design a new synchronization procedure for 5G system.

Firstly, as already mentioned the bandwidth of 5G could be much larger compared with the design target of 20 MHz transmission bandwidth of LTE. Without any help from some prior information the receiver would potentially need to check all possible carrier frequencies on the channel raster. In general, the number of possible frequency raster locations in a given frequency span (supporting a few carriers) will be proportional to the transmission bandwidth multiplied by number of possible carriers, divided by the raster value. For 5 carriers in LTE this number could be something like 5×20/0.1=1000. Assuming a total bandwidth in 5G/NR of some multiple of 100 MHz this number could be much higher (e.g. 10×100/0.1=10000 assuming 10 carriers), and the implementation complexity and the tuning time when searching the whole bandwidth will be significantly increased compared with LTE using a 100 kHz channel raster. In addition, the introduction of NR/5G is likely to increase the number of possible frequency spans which should be searched for synchronization sequences.

Secondly, the carrier frequency of 5G/NR could be much higher compared with the LTE carrier frequency. The path loss when using these higher carrier frequencies is increased, which will limit/reduce the size of a cell. Smaller cells imply fewer users per cell, and with a larger bandwidth it will be possible to use more resources in the frequency domain to accommodate the synchronization signals (e.g. by use of different frequencies), which will make it possible to reduce the interference between synchronization signals from different cells.

Thirdly, different bandwidths (in the form of carriers or CCs) may be available to a terminal. For example a carrier with a typical bandwidth 10 MHz as in 4G/LTE would be expected to use the current defined raster value 100 kHz, whereas a 5G/NR carrier with an extremely large bandwidth can have a large raster value to keep a reasonably small number of possible carrier locations. The terminal (henceforth referred to as a UE) may determine the appropriate raster in different ways, such as:

Prior knowledge of the raster to be assumed for a particular frequency span (or part of a frequency span) e.g. defined in specification or pre-stored (e.g. on a SIM card).

Signalling (via a carrier on a different frequency) indicating the raster to be applied Blind detection: Making an initial search with a coarse raster and if this fails making a subsequent search with a fine raster It is also possible that both a large raster channel value and a traditional small channel raster value can be employed for the 5G carrier at the same time, as shown in FIG. 1. In FIG. 1, the horizontal direction is a frequency axis, and the vertical arrows represent signals transmitted at particular frequencies. The upper part of the Figure shows the raster pattern 50 for a 4G carrier (Band B1) with relatively fine raster locations 51 at fixed 100 kHz intervals. Indicated at 100 is a raster pattern 100 for a 5G carrier (Band B2) consists of a coarse raster indicated by the solid arrows 101, with some additional possible carrier locations with a fine raster around the coarse locations (as shown by the dashed arrows 102). In other words, two raster spacings may be employed simultaneously in the same frequency span. This allows for some fine adjustment without too many different possible frequencies to search.

The system information design in LTE can be viewed as a tiered system by jointly considering the importance of the information, the sequence of the information (logically information A should be obtained before acquiring information B) and the corresponding transmission overhead. In LTE some crucial information is included into the Master Information Block (MIB) and broadcasted by the BS (called eNB in LTE) through PBCH (LTE Physical Broadcast Channel), using the 6 RBs (Resource Block) in the middle of the system bandwidth where PSS and SSS are also located. In LTE the system bandwidth has only a few possible settings with a range from 1.4 MHz to 20 MHz but a terminal has to support all possible settings, i.e., any particular setting deployed by the system. By broadcasting PBCH, PSS and SSS in the middle of the system bandwidth, a terminal will always be able to find synchronization signals and MIB no matter what the system bandwidth is, i.e., the detection of synchronization signal and MIB is independent of bandwidth. The synchronization signal and MIB design implies the following relationship between them: within the system bandwidth there is one and only one frequency domain location where PSS exists; one PSS is accompanied by one SSS signal in the same location in the frequency domain. The location of the MIB in the frequency domain is bounded by the 6 RBs in the middle of the system bandwidth which is indicated by the PSS.

A 5G/NR system has many different properties compared with those of LTE, for example as mentioned before, a huge chunk of spectrum may be allocated for the NR system bandwidth (or equivalent) and the bandwidth supported by a particular terminal could be smaller than the corresponding system bandwidth.

As well as providing signals for cell detection in 5G/NR, the PSS/SSS may also act as reference signals for demodulation of PBCH and/or act as reference signals for measurements used in Radio Resource Management (RRM). RRM measurements such as Reference Signal Received Power (RSRP) or Reference Signal Received Quality (RSRQ) may be made by the UE and used as a basis for cell selection and/or reported to the network to enable the appropriated handovers to new cells.

Considering these new challenges it is desirable to have new design of synchronization signals and MIB transmission for NR. The specific problem addressed here is the design of PSS/SSS to simultaneously support the following:

Cell detection and identification by UEs with limited bandwidth capability

RRM measurements over a wide bandwidth by UEs capable of wideband operation. This would include UEs where wideband capability is provided by parallel operation multiple receiver chains, each of limited bandwidth capability.

Figure 2:
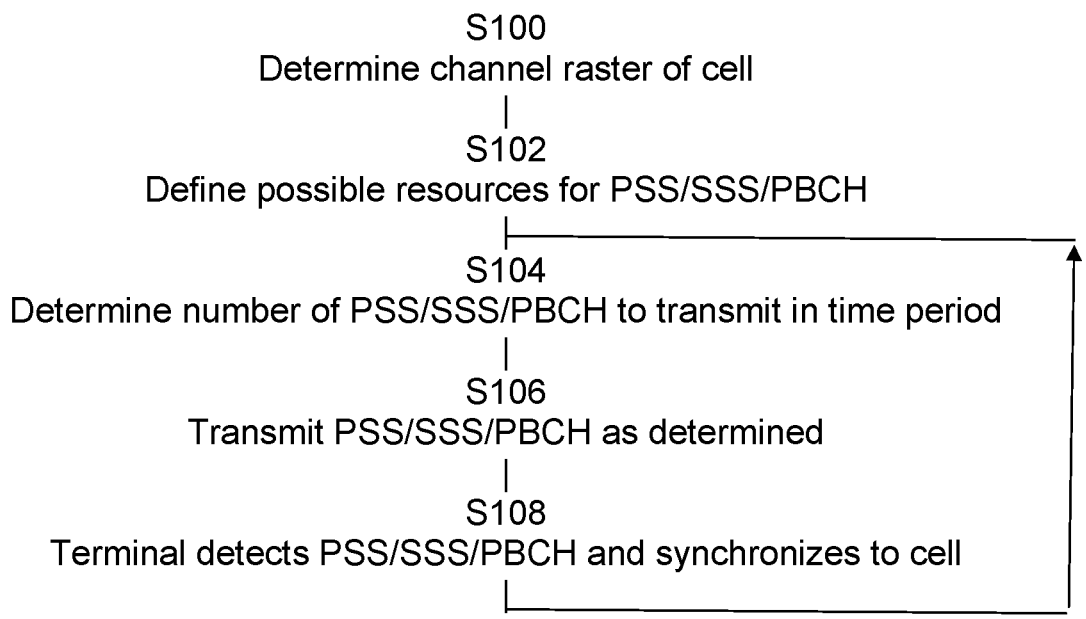
FIG. 2 outlines steps in a procedure embodying the disclosure.

The principle in embodiments is outlined in the flowchart of FIG. 2. It is assumed that one cell will employ one frequency span for both its uplink and downlink communications with terminals. It is further assumed that a terminal wishes to synchronize with a cell provided by an operator in a particular frequency span. A default numerology will be associated with the frequency span, for example as shown in Table 2 above. In step S100, a channel raster value used by the cell will be determined by the numerology. As already mentioned, a channel raster is a set of locations in the frequency domain where a signal or channel (or more precisely a carrier wave thereof) can be located, and the term "channel raster value" denotes the step size or spacing between these frequency locations.

In step S102 possible resources for PSS/SSS/PBCH are defined. For example these may comprise all the raster locations across the frequency span as defined by the channel raster value. If a subset of the available raster locations is used, these should preferably be distributed over the whole frequency span for facilitating measurements (see below). Such locations will normally be predefined as part of the system implementation, but may be varied from time to time and instructed by higher-level signalling to a base station or equivalent such as a so-called gNB (next generation NodeB), which controls a Transmission/Reception Point (TRP) providing the cell. Step 104 is performed at the cell (base station) level and involves determining how many of the possible resources to use for actual transmission of PSS/SSS/PBCH, in other words how many instances of each of PSS, SSS and PBCH are required. In other words the number of transmissions within a predetermined time period (such as a frame) is determined, and factors to be considered in this determination relate to the deployment scenario, including the presence of neighbouring cells possibly causing interference, number and range of terminals etc. In addition to the number of instances, the actual locations are also determined. Regarding the possible resources in the frequency domain as a list arranged in order of frequency, if M PSS are required then the first M locations may be chosen for example. In practice, two or three instances in the frequency domain may be sufficient. If a gNB wishes to add an instance it may simply use the next available resource in the list. The respective number of instances of each of PSS, SSS and PBCH may differ as explained below. At a minimum, the operator merely needs to ensure that at least one PSS/SSS/PBCH is transmitted within the whole frequency span.

Then in step S106 the cell transmits PSS/SSS/PBCH in a number of instances, and in the resources previously determined. In step S108 a terminal performs scanning by searching for a synchronization sequence in locations corresponding to the channel raster value, in a manner corresponding to the known use of PSS/SSS outlined in the introduction. The terminal may be configured in advance with the channel raster value and the synchronization signals to search for. By detecting one or more of the PSS/SSS/PBCH transmissions, the terminal becomes synchronized to the cell. Then the flow returns to step S104 allowing the process to be repeated for a next time period, such as a frame or multiple frames. Thus the gNB will again transmit PSS/SSS/PBCH in a subsequent time frame, possibly in a different number of instances following a fresh determination of the numbers of transmissions required, allowing other terminals to synchronize with the cell.

Note that signals such as PSS/SSS/PBCH are not necessarily transmitted at the same locations in the time domain (i.e. not necessarily simultaneously), and the resource used may have flexible or pre-determined time domain locations within a suitable time frame such as slot, subframe or radio frame.

Embodiments will now be described with reference to embodiments based on a 5G/NR system which is assumed to share many characteristics with LTE.

The following embodiments involve transmission of multiple PSS within the system bandwidth of a cell (also referred to here as a "frequency span", since the concept of system bandwidth in LTE may be modified for use in NR).

A first embodiment has PSS transmissions for a cell in multiple locations within the frequency domain.

The PSS transmissions are not necessarily uniformly spaced in the frequency domain. The possible frequency domain locations of PSS would be indicated by a channel raster whose value may depend on the frequency span (system bandwidth) or the spectrum location or both. It may be possible to have multiple channel raster values within one frequency span and it is also possible that these PSS locations in the frequency domain are indicated by channel raster with different step values. Incidentally, multiple channel raster values could be used by one cell, allowing a UE to perform a quick search (using larger channel raster) during its initial search and then perform a refined search (maybe based on the information obtained through the first search); this can reduce the complexity and speed up the initial search process.

Figure 3:
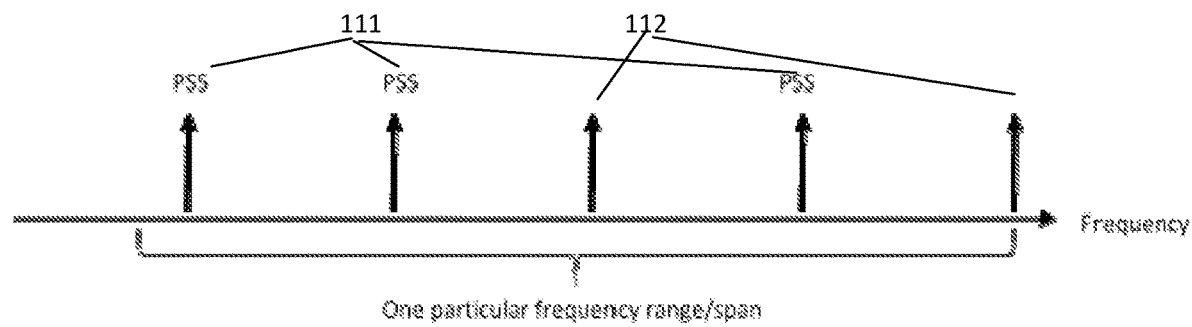
FIG. 3 illustrates one embodiment of the present disclosure featuring multiple PSS transmissions over one particular frequency range.

For simplicity, multiple possible PSS locations can be according to a channel raster with a uniform step value within a particular frequency range/span. One example is illustrated in FIG. 3 where multiple PSS are transmitted at locations 111 indicated by one particular channel raster within a frequency range. The upward arrows show the possible locations of PSS with the third and fifth possible locations 112 unused in this example.

Figure 4:
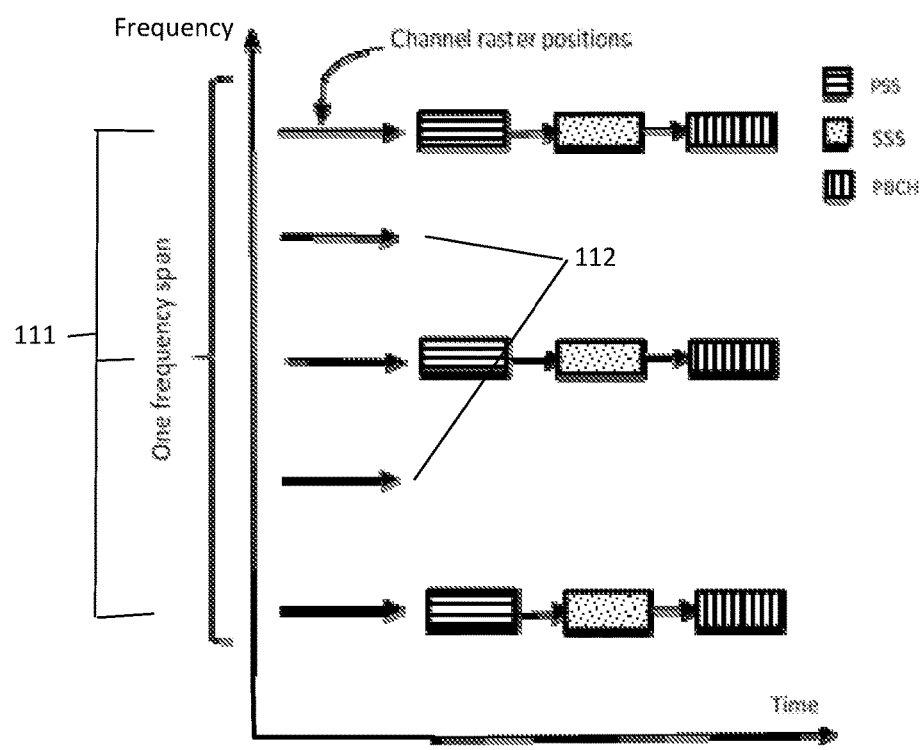
FIG. 4 illustrates an embodiment providing multiple PSS, SSS and PBCH.

FIG. 4 shows the same idea with resource allocations for the respective PSS in time and frequency domains, where PSS is transmitted at each of locations 111, and possible locations 112 are not selected in this example. In this first embodiment, instances of SSS and PBCH corresponding to each PSS are also transmitted at the same frequencies; thus, the same numbers of PSS/SSS/PBCH are transmitted. It should be noted that in this and other figures the shaded rectangles representing PSS, SSS and PBCH respectively are schematic and do not necessarily represent the size of resource needed to transmit each signal or channel. However, it will significantly reduce the blind detection burden of a UE if all PSS/SSS have the same amount of time/frequency resource. Similarly the gaps shown between PSS/SSS/PBCH do not necessarily represent the size of any time domain offset between these signals. Such a time offset could also be zero (e.g. one or more of PSS/SSS/PBCH could be transmitted simultaneously). In this case one or more of the signals could share the same resource or be transmitted at different frequency domain raster locations, or with a pre-determined frequency offset from a raster location.

Figure 5:
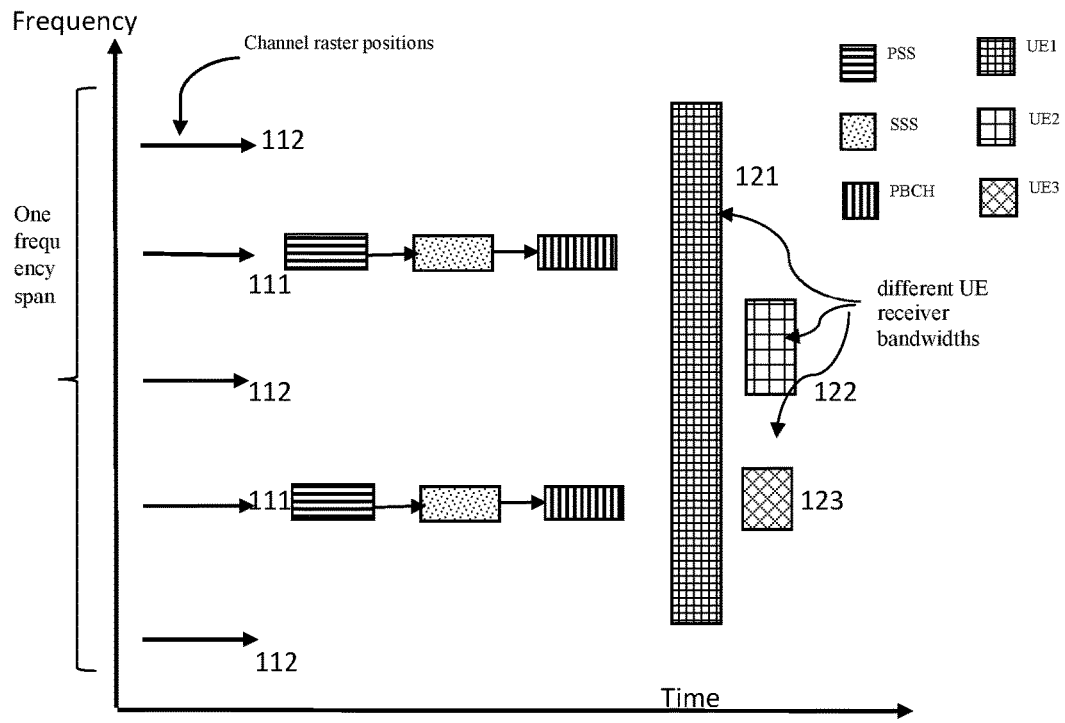
FIG. 5 illustrates an embodiment in which different UEs have different supported bandwidths.

The different PSS/SSS/PBCH instances can be received by UEs with different bandwidth capabilities as shown in FIG. 5. Unlike in LTE, in 5G/NR a terminal is not mandated to support all available system bandwidths.

For example, UE1 with wideband capability as indicated at 121 can receive multiple instances of PSS/SSS/PBCH simultaneously, transmitted at both frequency domain locations 111, while UE3 having a narrower receiving capability indicated by 123 can only receive one instance at a time. UE2 is shown operating at a frequency range 122 where there is no PSS/SSS/PBCH, only an unselected location 112. UE2 would need to be retuned to one or other of locations 111 in order to receive either instance of PSS/SSS/PBCH actually transmitted.

Figure 6:
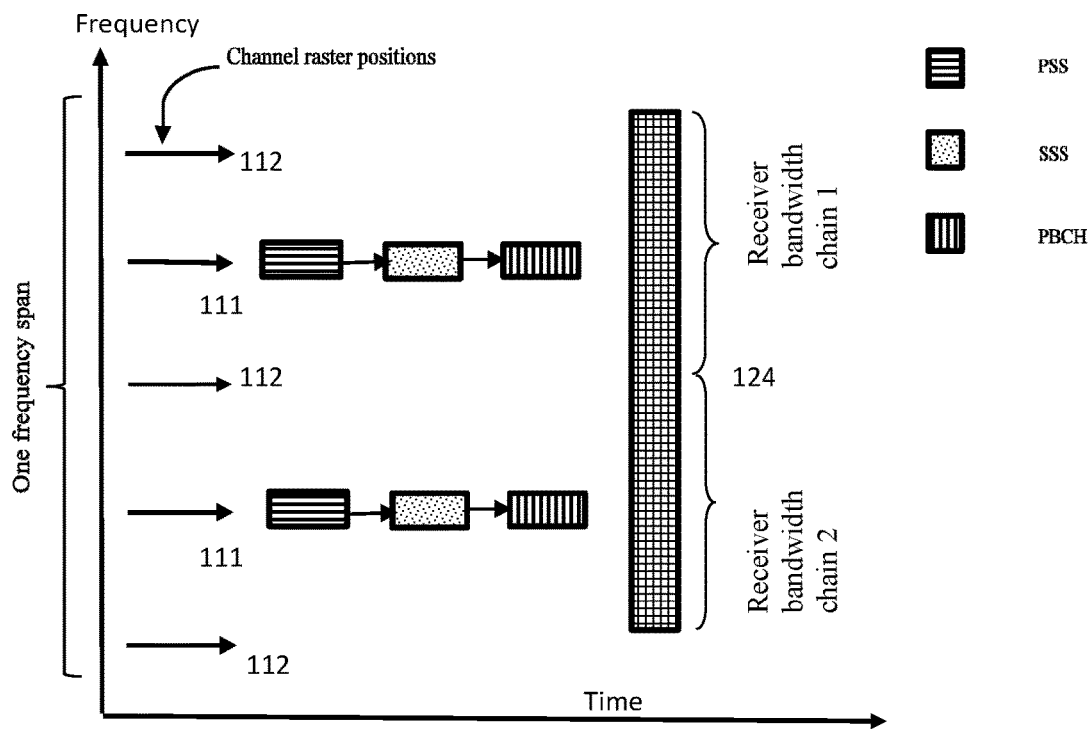
FIG. 6 illustrates a UE having a wide bandwidth using two receiver chains.

One possible feature in NR is to allow a UE to operate in a wide bandwidth by using two or more receiver chains with narrow bandwidth, as shown in FIG. 6. The wide bandwidth is indicated at 124 and allows the UE to detect both instances of PSS/SSS/PBCH at frequency domain locations 111. As indicated in the Figure, the wide bandwidth is provided by twin receiver chains in adjacent narrow bandwidths. Such a mode of operation might lead to a discontinuity in the transmission path in the region of transition from one receiver chain to the other, e.g. if the two receiver chains have different phase and/or amplitude characteristics. Tracking any phase or amplitude differences would be facilitated by transmission of suitable reference signals in the frequency ranges covered by each receiver chain. PSS/SSS could act as reference signals for this purpose.

In more detail, advantages of multiple PSS and/or SSS and/or PBCH transmissions include the following.

(i) Reduced Cell Search Duration

Two scenarios are proposed: the first scenario is that a terminal has some pre-configured cell search information about where to find synchronization signals during the initial access process. Under this scenario the gain on cell search time reduction is limited. The second scenario is that a terminal does not have or does not have proper pre-configured cell search information. Under this scenario the cell search time could be significantly reduced by introducing multiple PSS. For example if a terminal searches a particular frequency range from one end of this frequency range to the other end, having multiple PSS over the whole frequency range may significantly reduce the search time, especially when PSSs are transmitted near the upper and lower bounds of this frequency range.

(ii) Frequency Diversity

Multiple PSS/SSS/PBCH transmissions in different regions over the operating bandwidth will allow frequency diversity gain (improving the chances of receiving PSS/SSS/PBCH at one or other frequency). This could improve the probability of correct cell identification based on PSS/SSS, and the reliability of reception of PBCH. However, the UE would ideally need to know the frequency domain locations of the different transmissions.

(iii) Better Support for with UEs Having Different Capabilities

In NR a terminal may not support the whole operating bandwidth. However the NR specification is unlikely to mandate a terminal to use a particular frequency range within the system bandwidth. Hence a terminal with limited bandwidth capability could have a choice of more than one part of the spectrum and still receive PSS/SSS/PBCH, such as UE3 in FIG. 5. A terminal might use a frequency range where no PSS (or SSS and PBCH) is transmitted in this frequency range (such as UE2 in FIG. 5); this terminal may need to frequently retune to another frequency region in order to detect synchronization signals or PBCH (before typically retuning again back to its original frequency). The RF retune may require a terminal to create a gap on transmission/reception, therefore reducing its throughput performance. Alternatively it is possible to ensure that the supporting bandwidth of a terminal always includes the frequency domain location where PSS/SSS/PBCH is transmitted. However this means the system loading, and hence associated interference between cells, may concentrate on the frequency regions around the place where PSS/SSS/

PBCH is transmitted. With the introduction of multiple PSS (PSS/SSS/PBCH) transmission, the aforementioned issue will be eased.

Figure 7:
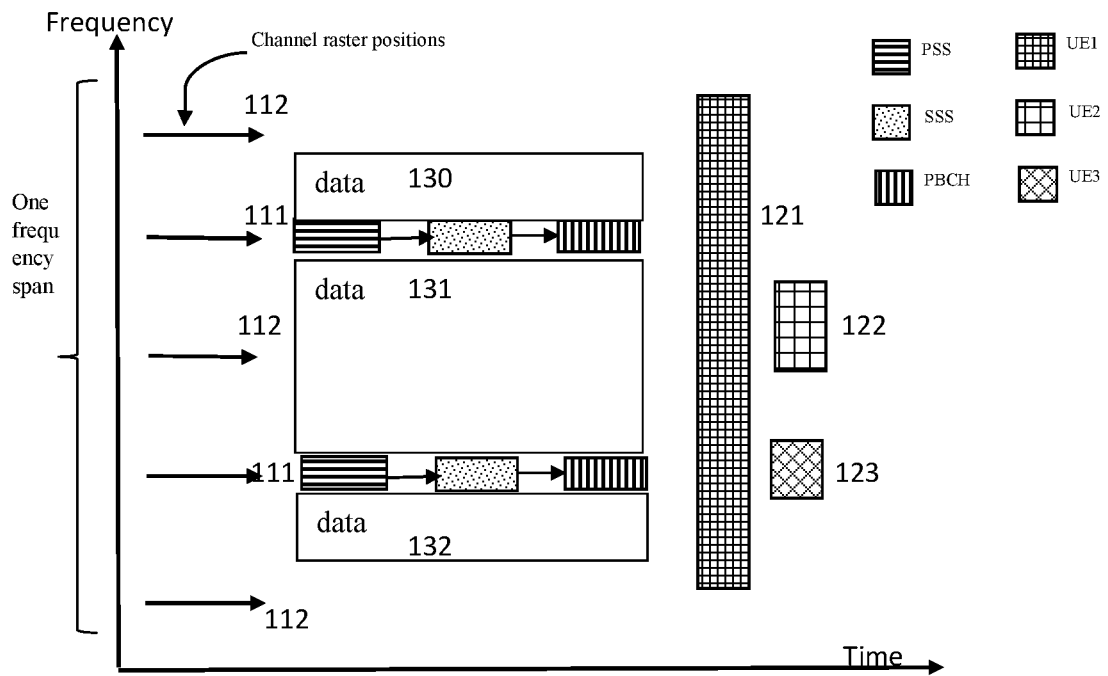
FIG. 7 illustrates transmission of data along with PSS/SSS/PBCH.

FIG. 7, based on FIG. 5, illustrates the above point. As illustrated by the rectangles 130, 131 and 132, the resources in which PSS/SSS are not transmitted can be used to transmit data. UE1 having a wide receiving bandwidth 121 can receive some data and PSS/SSS at the same time. UE2's limited receiving bandwidth 122 is shown as tuned to data region 131; if it is retuned to get PSS/SSS, will not obtain data transmitted in region 131, on the other hand in the region of the nearby PSS/SSS there will not be any data scheduled to UE2. Thus retuning to obtain PSS/SSS/PBCH followed by tuning back to the original frequency will be required.

(iv) Improved RRM Measurements.

After a UE has connected to the network, it may continue to detect PSS/SSS for the purpose of measurements, treating PSS/SSS as reference signals. In the case that PSS/SSS are used for RRM measurements, multiple PSS/SSS will enable UEs to make corresponding RRM measurements reflecting the channel characteristics over a wider bandwidth than conventional PSS/SSS. The same benefit could apply for other signals used for RRM measurements (e.g. DeModulation Reference Signals, DMRS of PBCH). In NR there may be a special DMRS signal mainly used for PBCH detection. Therefore if PBCH are transmitted at different frequency location, there are more PBCH DMRS to be used for RRM purposes.

In one variation of the first embodiment, each PBCH contains identical information, but the other characteristics of the PBCH could be different, such as different scrambling codes which would enable the respective PBCH to carry different information.

Thus, in a further variation of the first embodiment, each PBCH may contain different information, for example a list or other indication of the existence of locations of the additional PSS/SSS/PBCH in the same frequency span (for simplicity, the list of locations could include that of the transmitting PBCH itself).

In other embodiments based on the first embodiment the relationship (mapping) between PSS and/or SSS and/or PBCH is not restricted to a one-to-one mapping format (as applies in LTE), allowing more flexibility such as many-to-one or one-to-many mappings.

With multiple PSS transmission, we can further extend the mapping between PSS and SSS. In general the mapping between the PSS and SSS over a particular frequency range/span can be that M PSS are mapped to N SSS where M≥1 and N≥1; M can either ≥N or ≤N. The mapping relationship can be by Frequency-Division Multiplexing, FDM, Time-Division Multiplexing, TDM or both FDM and TDM applied simultaneously. Similarly, mappings between SSS and PBCH can be devised.

Figure 8:
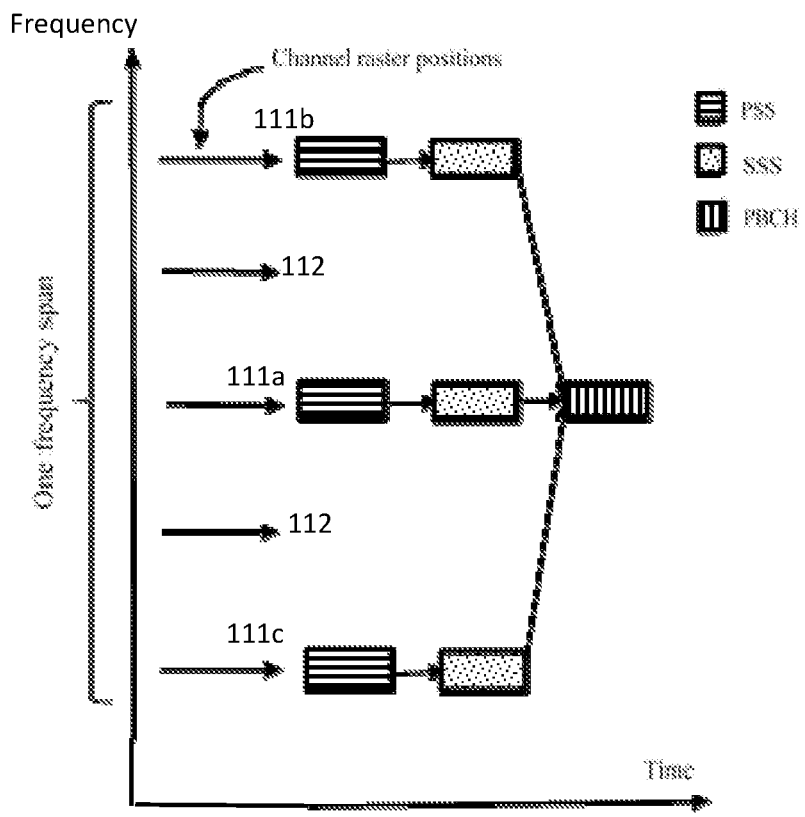
FIG. 8 illustrates an embodiment providing multiple PSS and SSS mapped to a single PBCH.

In a second embodiment based on the first embodiment we consider the case where one SSS corresponds to each PSS, but multiple SSS are mapped to one PBCH, as shown in FIG. 8. In this case we can distinguish between a location 111a at which all of PSS/SSS/PBCH are transmitted, and locations 111b and 111c where PSS/SSS (but not PBCH) are transmitted. This has the advantage that PBCH transmission uses less overhead, and generates less interference to other cells than in the first embodiment, but RRM measurements based on PSS/SSS can still be carried out over a wide bandwidth. During cell search a UE might identify the presence of PSS/SSS without a corresponding PBCH. The UE may then assume that the PBCH is located at some other frequency.

In a variation of the second embodiment, the PBCH may be located at a frequency (on a raster) which does not have a corresponding PSS and/or SSS transmission. This could be one of the unused locations 112 in FIG. 8, but need not be (in other words, PBCH could be on another raster from that shown by the arrows).

Figure 9:
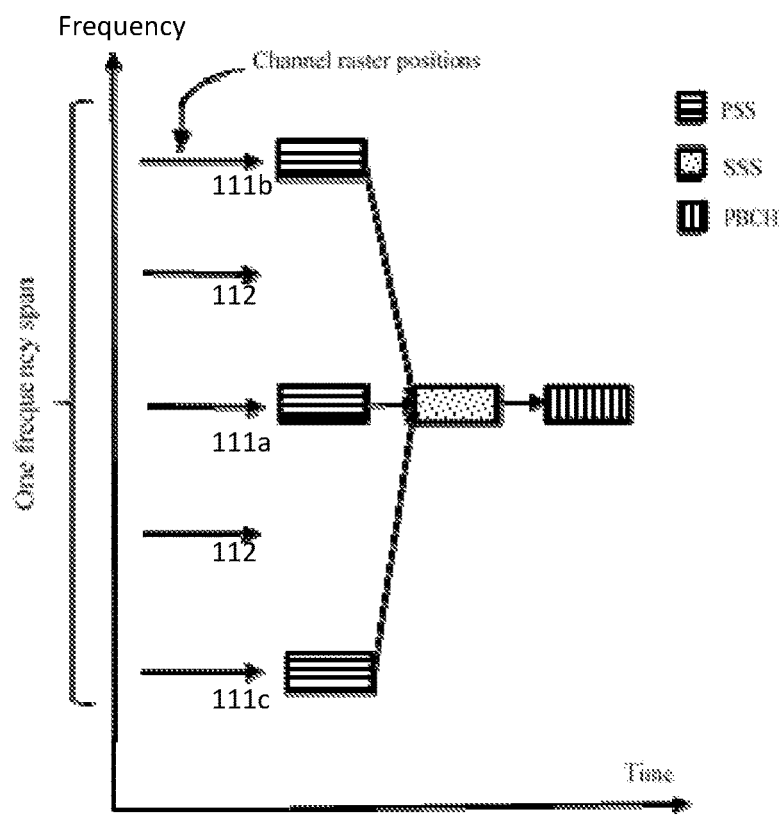
FIG. 9 illustrates an embodiment providing multiple PSS mapped to a single SSS and PBCH.

A third embodiment based on the second embodiment considers the case where multiple PSS mapped to one SSS and one PBCH, as shown in FIG. 9. In this case, all of PSS/SSS/PBCH are transmitted at frequency location 111a, whilst only PSS is transmitted at each of locations 111b and 111c. This further reduces the overhead compared with the second embodiment, due to less resource used for transmission of SSS. However, wide band RRM measurements would need to rely on PSS (or some other signal) rather than on SSS, since SSS is only transmitted in one location in this example. Thus, measurement based on PSS is more likely to reflect the real radio conditions on a wide frequency range.

In a fourth embodiment, which is based on the first embodiment, the number of transmissions (instances) of any of PSS/SSS/PBCH can be changed with time, based on gNB configuration, providing that at any time instance, for the cell to be detectable, at least there should always be one PSS/SSS/PBCH being transmitted. This flexibility will allow the gNB to get a better tradeoff between synchronization signal overhead (and corresponding interference to other cells) and the system performance. For example, if cell acquisition by cell search is not a high priority and there are no UEs served by the cell with wideband capability, a single PSS/SSS/PBCH could be sufficient. As already mentioned with respect to FIG. 2, the configuration may be changed every predetermined time period, such as multiples of a frame.

In a variation of the fourth embodiment the mapping between PSS, SSS and PBCH could also be changed with time, for example switching between the first, second and third embodiments.

Figure 10:
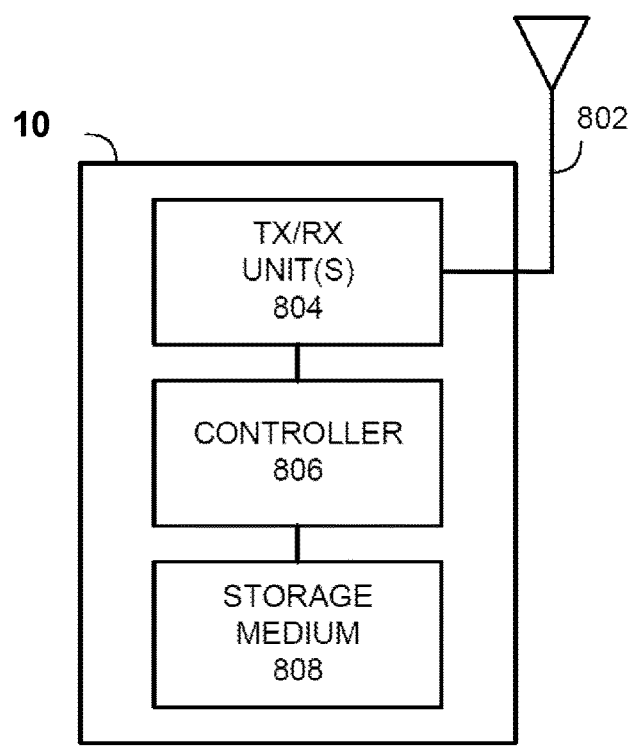
FIG. 10 is a schematic block diagram of a terminal to which the present disclosure may be applied.

FIG. 10 is a block diagram illustrating an example of a terminal 10 to which the present disclosure may be applied. The terminal 10 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The terminal 10 includes at least one transmitter/receiver unit 804 (each providing one receiver chain as mentioned above) connected to at least one antenna 802 (together defining a communication unit) and a controller 806 having access to memory in the form of a storage medium 808. The controller 806 may be, for example, a microprocessor, digital signal processor (DSP), application-specific integrated circuit (ASIC), field-programmable gate array (FPGA), or other logic circuitry programmed or otherwise configured to perform the various functions described above, including detecting PSS/SSS/PBCH for the purposes of cell search and synchronization. For example, the various functions described above may be embodied in the form of a computer program stored in the storage medium 808 and executed by the controller 806. The transmission/reception unit 804 is arranged, under control of the controller 806, to receive synchronization signals from cells, and subsequently to receive PBCH as discussed previously. The storage medium 808 stores the synchronization information so obtained.

Figure 11:
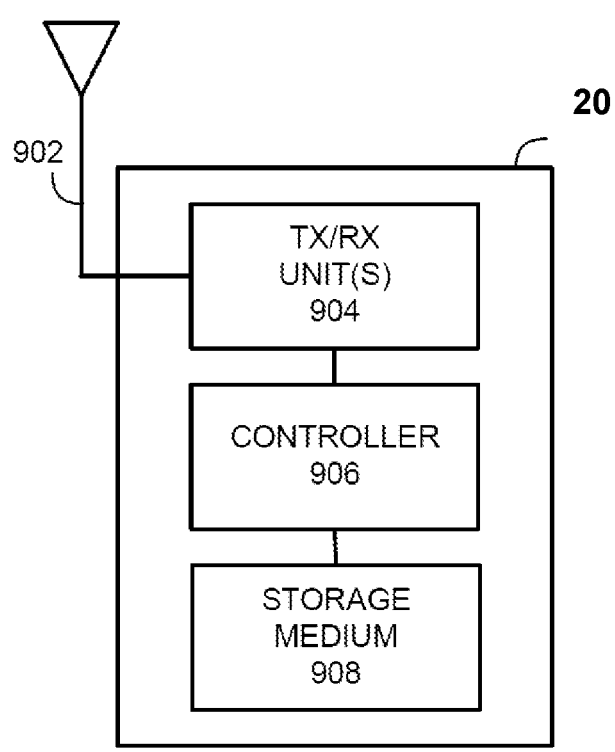
FIG. 11 is a schematic block diagram of a base station to which the present disclosure may be applied.

FIG. 11 is a block diagram illustrating an example of a base station (e.g., gNB) 20 responsible for one or more cells. The base station includes transmitter/receiver unit(s) 904 connected to at least one antenna 902 (together defining a communication unit) and a controller 906. The controller may be, for example, a microprocessor, DSP, ASIC, FPGA, or other logic circuitry programmed or otherwise configured to perform the various functions described above, including determining how many PSS/SSS/PBCH are transmitted and in which locations, as mentioned earlier with respect to FIG. 2. For example, the various functions described above may be embodied in the form of a computer program stored in the storage medium 908 and executed by the controller 906. The transmission/reception unit 904 is responsible for broadcasting synchronization signals, PBCH and so forth, under control of the controller 906.

To summarise, embodiments of the present disclosure focus on the PSS/SSS/PBCH transmission for 5G(NR) system, where a cell, with which a terminal wishes to synchronize, has a frequency span in the frequency domain. The method comprising setting a numerology for the system in dependence on factors such as the frequency band, and the frequency span, which further determine a channel raster used in the cell; defining, using the channel raster, a plurality of possible locations distributed across the frequency span for transmitting PSS/SSS/PBCH; determining how many instances of PSS, SSS and PBCH are required in the current time period; transmitting the number of instances of PSS, SSS and PBCH thus determined; and a terminal detecting one or more instance of PSS/SSS/PBCH in order to connect with the cell. Multiple transmissions of PSS/SSS/PBCH allow a terminal to detect these signals more easily, and facilitate use of PSS or SSS as reference signs for RRM purposes. Different numbers of PSS/SSS/PBCH may be transmitted with respective mappings between them, and the numbers of transmissions may vary over time. Multiple PSS/SSS/PBCH transmissions over the operating bandwidth are provided. In addition various possible mappings between PSS and SSS, and between SSS and PBCH are proposed, which may change with time.

Various modifications are possible within the scope of the present disclosure.

With respect to the "mapping" between PSS and SSS referred to above, the Figures show cases where there are more PSS than SSS. The reverse is also possible, i.e. fewer PSS than SSS. Thus, although the above embodiments involve transmission of multiple PSS within the system bandwidth of a cell, this is not necessarily essential to the disclosure.

The mapping does not necessarily involve transmitting all of PSS/SSS/PBCH at the same frequency locations. As mentioned, the mappings may involve FDM, therefore, with respect to FIG. 8, for example PBCH could be transmitted at a different frequency location from PSS/SSS.

In some proposals for 5G, a cell is provided by a "beam" which is one of multiple beams provided from a transmission/reception point via digital beamforming. Since the present disclosure focuses on the time/frequency domain and beams are in the spatial domain, the present disclosure can also be applied to such multiple beams. A simple extension is to apply the measures taken in the time/frequency domain in any of the above embodiments, to each spatial domain (beam). Broadcasting of PSS/SSS/PBCH as referred to above includes transmitting them on any one or more of such beams, including swept beams. The term "cell" is therefore to be interpreted broadly and includes parts of a cell, a beam, and the coverage area of an access point, transmission point or other network node.

The disclosure is equally applicable to FDD and TDD systems, and to mixed TDD/FDD implementations (i.e., not restricted to cells of the same FDD/TDD type). References in the claims to a "terminal" are intended to cover any kind of user device, subscriber station, mobile terminal and the like and are not restricted to the UE of LTE.

In any of the aspects or embodiments of the disclosure described above, the various features may be implemented in hardware, or as software modules running on one or more processors.

The disclosure also provides a computer program or a computer program product for carrying out any of the methods described herein, and a computer readable medium having stored thereon a program for carrying out any of the methods described herein.

A computer program embodying the disclosure may be stored on a computer-readable medium, or it may, for example, be in the form of a signal such as a downloadable data signal provided from an Internet website, or it may be in any other form.

It is to be clearly understood that various changes and/or modifications may be made to the particular embodiment just described without departing from the scope of the claims.

INDUSTRIAL APPLICABILITY

By enabling multiple PSS/SSS/PBCH transmission, embodiments of the present disclosure can provide frequency diversity gain for PSS detection, reduce search time during initial access, and improve RRM measurements, with the possibility of control over overhead and interference to other cells.

What is claimed is:

1. A base station in a wireless communication system comprising:
   a processor configured to:
   configure a plurality of resources for transmitting a synchronization signal and a related broadcast channel, the synchronization signal including one or more instances of a primary synchronization signal and one or more instances of a secondary synchronization signal used by a terminal in the wireless communication system to synchronize with a cell,
   determine the number of transmissions of each comprising the synchronization signal and the related broadcast channel within a predetermined time period, the number of transmissions is more than one; and
   a transmitter configured to transmit the synchronization signal and the related broadcast channel in more than one of the plurality of resources, wherein the more than one of the plurality of resources have different locations in a frequency domain such that the transmissions each including the synchronization signal and the related broadcast channel have different locations in the frequency domain.

2. The base station according to claim 1, wherein the processor is further configured to define possible resources for the related broadcast channel such that there is a predetermined relationship between a resource in which the instance of the secondary synchronization signal is transmitted and at least one resource in which the broadcast channel is transmitted.

3. The base station according to claim 2, wherein the secondary synchronization signal is used by the terminal to obtain further information about the cell, and the processor is further configured to define the possible resources for transmission of the secondary synchronization signal such that there is a predetermined relationship between a resource in which a primary synchronization signal is transmitted and at least one resource in which a secondary synchronization signal is transmitted.

4. The base station according to claim 3, wherein the processor is further configured to provide a mapping of an integer number M of transmissions of the primary synchronization signal to an integer number N of transmissions of the secondary synchronization signal where M>=1, N>=1 and M>=N or M<=N.

5. The base station according to claim 1, wherein the transmitter is further configured to transmit the synchronization signal and the related broadcast channel includes determining how many of the plurality of resources to employ for transmitting a primary synchronization signal in a time frame, whereby the number of resources, each employed for transmitting one instance of the primary synchronization signal, may vary from one time frame to another time frame.

6. The base station according to claim 1, wherein the transmitter is configured to transmit the synchronization signal and the related broadcast channel using a broadcast channel.

7. The base station according to claim 6, wherein the broadcast channel is transmitted in the plurality of resources within a frequency span and an identical content is transmitted in each of the resources.

8. The base station according to claim 1, wherein the plurality of resources are distributed over substantially the whole frequency span used by the cell.

9. A terminal in a wireless communication system comprising:
a receiver configured to receive a synchronization signal and a related broadcast channel in at least one of more than one of the plurality of resources, the synchronization signal including one or more instances of a primary synchronization signal and one or more instances of a secondary synchronization signal used by a terminal in the wireless communication system to synchronize with a cell, the more than one of the plurality of resources have different locations in a frequency domain such that the transmissions each including the synchronization signal and the related broadcast channel have different locations in the frequency domain; and
a processor configured to perform a process to synchronize with a cell according to the synchronization signal.

10. The terminal according to claim 9, wherein the receiver is further configured to receive the synchronization signal and the related broadcast channel the number of transmissions of each comprising the synchronization signal from a base station that configures the plurality of resources and determine the number of transmissions of each including the synchronization signal and the related broadcast channel within a predetermined time period, the number of transmissions is more than one.

11. A wireless communication system comprising:
a base station configured to:
configure a plurality of resources for transmitting a synchronization signal and a related broadcast channel, the synchronization signal including one or more instances of a primary synchronization signal and one or more instances of a secondary synchronization signal,
determine the number of transmissions of each comprising the synchronization signal and the related broadcast channel within a predetermined time period, the number of transmissions is more than one; and
transmit the synchronization signal and the related broadcast channel in more than one of the plurality of resources, wherein the more than one of the plurality of resources have different locations in a frequency domain such that the transmissions each including the synchronization signal and the related broadcast channel have different locations in the frequency domain; and
a terminal configured to:
receive the synchronization signal and the related broadcast channel in at least one of the more than one of the plurality of resources, and
perform a process to synchronize with a cell according to the synchronization signal.

\* \* \* \* \*